United States Patent
Ozawa et al.

(10) Patent No.: US 9,961,907 B2
(45) Date of Patent: May 8, 2018

(54) BLADE MEMBER FOR MULLING APPARATUSES AND MULLING APPARATUS

(71) Applicant: ZOJIRUSHI CORPORATION, Osaka-shi, Osaka (JP)

(72) Inventors: Teruyuki Ozawa, Osaka (JP); Eri Sasaki, Osaka (JP)

(73) Assignee: ZOJIRUSHI CORPORATION, Osaka (JP)

( * ) Notice: Subject to any disclaimer, the term of this patent is extended or adjusted under 35 U.S.C. 154(b) by 114 days.

(21) Appl. No.: 15/171,261

(22) Filed: Jun. 2, 2016

(65) Prior Publication Data
US 2016/0353748 A1    Dec. 8, 2016

(30) Foreign Application Priority Data
Jun. 5, 2015    (JP) .................................. 2015-115144

(51) Int. Cl.
| | |
|---|---|
| *A21C 1/02* | (2006.01) |
| *B01F 7/00* | (2006.01) |
| *B01F 7/16* | (2006.01) |

(52) U.S. Cl.
CPC ............ *A21C 1/02* (2013.01); *B01F 7/00291* (2013.01); *B01F 7/1675* (2013.01)

(58) Field of Classification Search
CPC ....... A21C 1/02; B01F 7/00291; B01F 7/1675
USPC .......................................................... 366/98
See application file for complete search history.

(56) References Cited

FOREIGN PATENT DOCUMENTS

EP    2465352    *    6/2012    ............... A21C 1/02

* cited by examiner

*Primary Examiner* — Mark Halpern
(74) *Attorney, Agent, or Firm* — Baker & Hostetler LLP

(57) ABSTRACT

A blade member has a shaft portion connected to a rotating shaft, and a blade plate portion projecting from the shaft portion toward an outer peripheral wall of a container. The blade plate portion has a plane-like configuration without being formed with a through-out portion, and extends in an up-and-down direction along the shaft portion. The blade plate portion has a projection portion, at a tip end side apart from the shaft portion, projecting upwardly. A top portion of the projection portion is non-edge surface without being formed with an angled portion.

10 Claims, 7 Drawing Sheets

BLADE MEMBER FOR MULLING APPARATUSES AND MULLING APPARATUS

CROSS-REFERENCE TO RELATED APPLICATION

This application claims priority to Japanese Patent Application No. 2015-115144 filed on Jun. 5, 2015, the content of which is incorporated herein by reference.

BACKGROUND OF THE INVENTION

Technical Field

The present invention relates to a blade member for mulling apparatuses and a mulling apparatus including this blade member.

Description of the Related Art

Each of JP 2-176324 A, JP 2700893 B1, and JP 4806195 B1 discloses a bread making apparatus capable of mulling bread ingredients by a blade member arranged at a bottom of a container, and baking a mulled bread dough to cook a loaf of bread. A blade member of JP 2-176324 A includes a blade plate portion formed with a through-out portion. A blade member of JP 2700893 B1 includes a blade projecting so as to have a triangle column-like configuration in a tip end of a plate-like portion placed in parallel to a bottom wall of a container. A blade member of JP 4806195 B1 includes at least two blade plate portions having different total heights from a shaft portion.

In order to cook a soft and tender loaf of bread, it is important to make a smooth and well-stretching bread dough. In order to make such a bread dough, it is important to develop chewy and elastic gluten by evenly and sufficiently mulling bread ingredients. However, by the blade members of JP 2-176324 A, JP 2700893 B1, and JP 4806195 B1, the bread ingredients are not sufficiently mulled, and there is room for improvement.

SUMMARY OF THE INVENTION

It is an object of the present invention to provide a blade member for mulling apparatuses and a mulling apparatus capable of evenly and sufficiently mulling ingredients.

The present invention is to provide a blade member for mulling apparatuses, including a shaft portion configured to be connected to a rotating shaft arranged within a container of a mulling apparatus, and a blade plate portion having a plane-like configuration without being formed with a through-out portion, projecting from the shaft portion toward an outer peripheral wall of the container, and extending in an up-and-down direction along the shaft portion, wherein the blade plate portion includes a projection portion at a tip end side apart from the shaft portion, the projection portion projecting upwardly, wherein a top portion of the projection portion is a non-edge surface without being formed with an angled portion. The tip end of the blade plate portion is a portion of the blade plate portion where a distance from the shaft portion is the greatest when viewed along an axial line of the shaft portion.

When the blade member connected to the rotating shaft is rotated, ingredients housed within the container (such as bread ingredients) are mulled (agitated) so as to be pushed out to the outer peripheral wall of the container. The blade member of the above aspect has the projection portion projecting upwardly at the tip end side. Thus, actions of pressing the ingredients onto the container to knead by the blade member and stretching the ingredients by the blade member can be sufficiently obtained. By the projection portion including the top portion formed with the non-edge surface, the blade member can grab the ingredients having a paste-like configuration and perform actions of moving and stretching without generating breakage of the ingredients. Therefore, without holding the ingredients in a part of the container, the ingredients can be evenly and sufficiently mulled, and a smooth and well-stretching dough can be made.

An upper rim portion of the blade plate portion has a height gradually increasing from the shaft portion to the top portion of the projection portion. According to this aspect, a portion projecting upwardly in the blade plate portion is only the top portion. Thus, portions other than the top portion do not grab the ingredients having the paste-like configuration, so that the breakage of the ingredients can be suppressed. Therefore, a smooth and well-stretching dough can be made.

The upper rim portion of the blade plate portion has a curve-like configuration curved toward a tip end rim portion of the blade plate portion when the blade plate portion is viewed from a front side of a rotational direction. According to this aspect, in the blade plate portion, an angle made by a tangent line of the upper rim portion and the tip end rim portion is the acutest angle in the top portion of the projection portion. Therefore, an action of grabbing the ingredients having the paste-like configuration can be sufficiently obtained, and an excessive load added onto a part of the ingredients can be suppressed to the maximum extent possible. By rotation of the blade member, the ingredients can be easily moved so as to come around the upper rim portion of the blade plate portion. Thus, an action of kneading can be improved.

A width between the tip end rim portion and the upper rim portion of the blade plate portion is gradually increased with being away from the top portion of the projection portion. In such a way, not by letting the projection portion projecting from the blade plate portion with a rod-like configuration but by letting the projection portion projecting with a substantially mount-like configuration, generation of the breakage of the ingredients due to addition of an excessive load onto a part of the ingredients at the time of mulling can be suppressed.

At least a part of the tip end rim portion of the blade plate portion is along an inner side surface of the outer peripheral wall of the container. According to this aspect, a region where the ingredients are kneaded and stretched can be ensured. Thus, the actions of kneading and stretching the ingredients can be improved. In addition, the projection portion is formed at the tip end side of the blade plate portion which is the most apart from the shaft portion. According to this aspect, the region where the ingredients are kneaded and stretched can be ensured to the maximum extent possible. Thus, the actions of kneading and stretching the ingredients can be further improved. The action of grabbing the ingredients having the paste-like configuration can also be improved.

The top portion of the projection portion is formed with at least a part of a sphere surface. According to this aspect, at the time of grabbing and moving the ingredients having the paste-like configuration, the breakage of the ingredients can be suppressed.

The tip rim end portion of the blade plate portion at a lower side with respect to the top portion of the projection portion is chamfered so as to have a radius of curvature less than 50% of a wall thickness of the blade plate portion. According to this aspect, a flat surface can be formed in the tip end rim portion of the blade plate portion. Therefore, the action of stretching the ingredients can be efficiently performed between the tip end rim portion of the blade plate portion and the outer peripheral wall of the container.

The upper rim portion of the blade plate portion is chamfered so as to have a semicircular sectional configuration. According to this aspect, a portion in sliding contact with the ingredients can be a curved surface. Therefore, at the time of stretching the ingredients having the paste-like configuration, the breakage due to the addition of an excessive load onto a part of the ingredients can be suppressed to a large extent.

In addition, the present invention is to provide a mulling apparatus including any of the blade member described above. According to this aspect, the ingredients can be evenly and sufficiently mulled and a smooth and well-stretching dough can be made.

The outer peripheral wall of the container has a polygon-like configuration including at least three flat plate portions having portions with being apart at the same distances with respect to the rotating shaft, and the portions of the flat plate portions are respectively formed with projecting ridges extending in the up-and-down direction and projecting toward the rotating shaft. According to this aspect, the outer peripheral wall of the container has the polygon-like configuration. Thus, by the rotation of the blade member, the actions of kneading and stretching the ingredients can be obtained respectively in the flat plate portions of the outer peripheral wall. By forming the projecting ridges in the flat plate portions, step portions are formed in the flat plate portions, and the step portions serve as flow resistance against the ingredients. Thus, the actions of kneading and stretching the ingredients can be further improved.

In the present invention, the projection portion projecting upwardly at the tip end side is provided in the blade plate portion. Thus, the actions of pressing the ingredients onto the container to knead by the blade member and stretching the ingredients by the blade member can be sufficiently obtained. By the projection portion including the top portion formed with the non-edge surface, the ingredients having the paste-like configuration can be grabbed without the breakage and the actions of moving and stretching can be performed. Therefore, holding of the ingredients in a part of the container can be suppressed. Thus, the ingredients can be evenly and sufficiently mulled.

DETAILED DESCRIPTION OF THE PREFERRED EMBODIMENTS

Hereinafter, an embodiment of the present invention will be described with the drawings.

Figure 1:
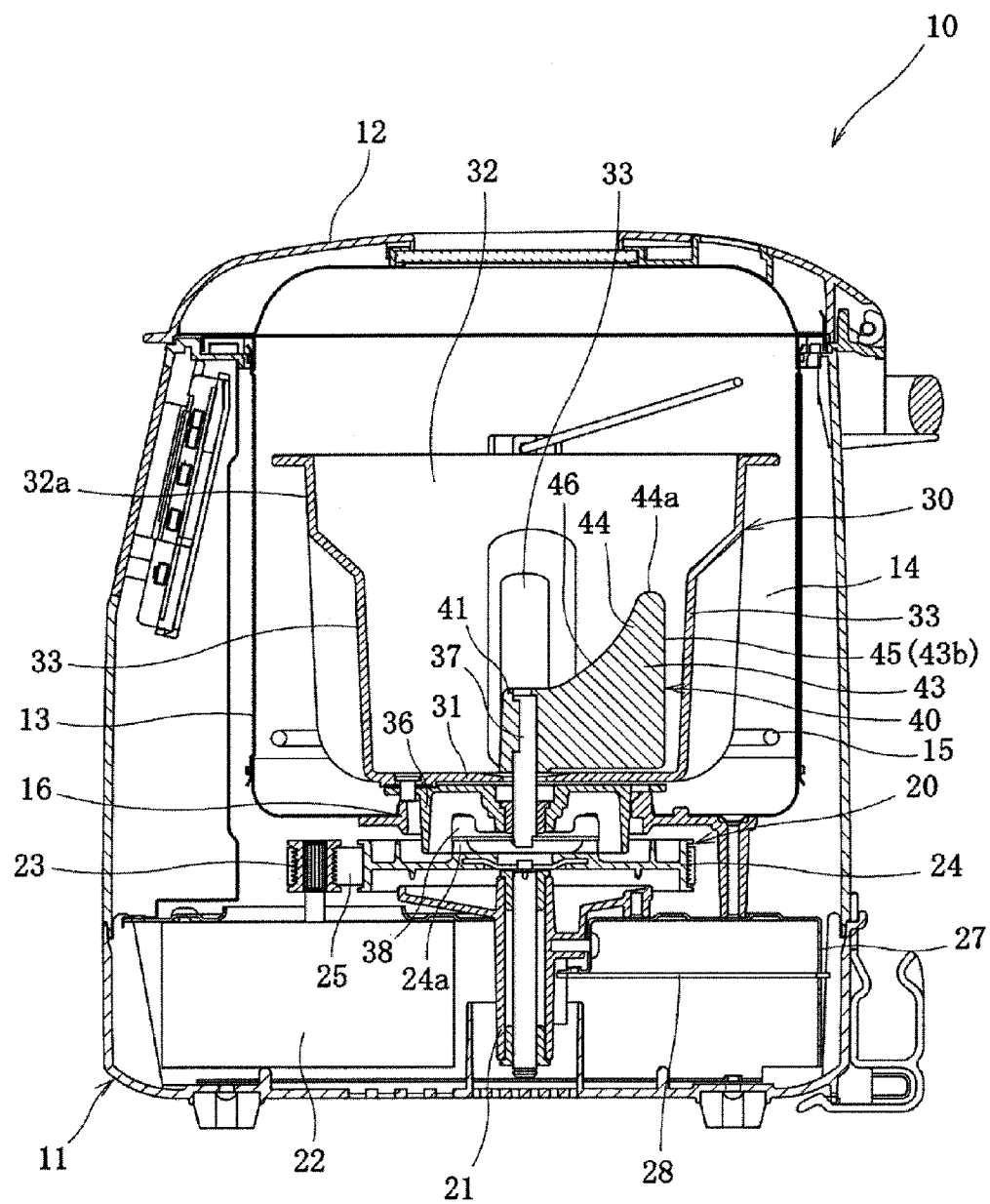
FIG. 1 is a sectional view of a bread making apparatus with a blade member of an embodiment of the present invention.

FIG. 1 shows a bread making apparatus 10 serving as a mulling apparatus in which a blade member 40 according to the embodiment of the present invention is used. In this bread making apparatus 10, a bread case (container) 30 and the blade member 40 are arranged inside an exterior case 11. The bread making apparatus 10 mulls bread ingredients such as dry yeast housed inside the bread case 30 by the blade member 40 to make a bread dough, and heats the bread dough by a heating portion 15 to cook a loaf of bread. In the present embodiment, a shape of the blade member 40 is improved, so that the bread ingredients can be evenly mulled and a smooth and well-stretching bread dough can be made.

(Detail of Bread Making Apparatus)

The bread making apparatus 10 includes the exterior case 11 having an openable/closable lid body 12. By arranging a heat insulating case 13 inside the exterior case 11, a baking chamber 14 is formed inside the heat insulating case 13. Inside the baking chamber 14, the heating portion 15 formed with a sheathed heater or the like is arranged. A through hole is provided at a bottom of the heat insulating case 13, and an annular frame member 16 is arranged in this through hole. By arranging the bread case 30 in the baking chamber 14, a base 36 of the bread case 30 passes through the frame member 16 and projects downwardly from the bottom of the heat insulating case 13.

Between the bottom of the heat insulating case 13 and a bottom of the exterior case 11, a drive mechanism 20 that rotates the blade member 40 via a rotating shaft 37 arranged within the bread case 30 is arranged. The drive mechanism 20 includes a bearing member 21 and a drive motor 22. By rotating a small-diameter first pulley (first rotation member) 23 connected to an output shaft of the drive motor 22, a large-diameter second pulley (second rotation member) 24 arranged in an upper portion of the bearing member 21 is rotated via an endless belt (transmission member) 25. By rotating the second pulley 24, a connection portion 24a provided in the second pulley 24 is rotated, the rotating shaft 37 is rotated via a connection member 38 to be described later, and the blade member 40 is rotated inside the bread case 30 via this rotating shaft 37.

In the bread making apparatus 10, a board case 27 to arrange a control board 28 beside the bearing member 21 is arranged so as to be placed at an opposite side of the drive motor 22. A microcomputer (not shown) installed in the control board 28 controls the heating portion 15 and the drive motor 22 to perform bread making processing. The bread making processing includes a pre-heating step of heating an interior of the baking chamber 14 to a setting temperature, a mulling step of rotating the blade member 40 to mull the bread ingredients, a fermenting step of fermenting the bread dough, and a baking step of baking the bread dough. These steps are executed in order by the microcomputer.

(Detail of Bread Case)

Figure 2:
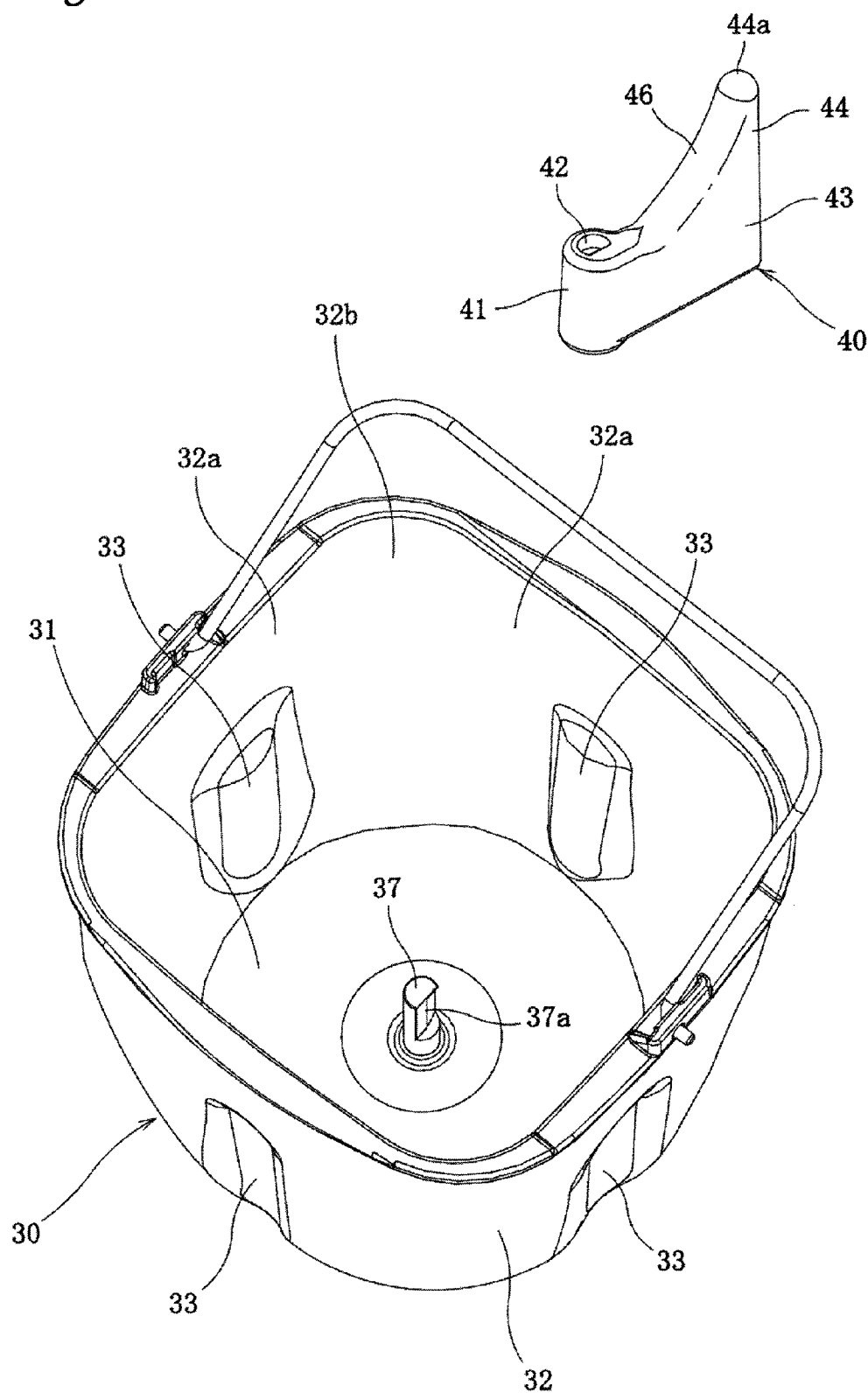
FIG. 2 is an exploded perspective view of a bread case and the blade member.

As shown in FIGS. 1 and 2, the bread case 30 is a container having a substantially square tube-like configuration in which an upper end is opened and a lower end is closed. The cylindrical base 36 is arranged at an outer surface side of a bottom wall 31 of the bread case 30, and the rotating shaft 37 is rotatably and axially supported on this base 36. One end (lower end) of the rotating shaft 37 is arranged in the base 36, and the other end (upper end) passes through the bottom wall 31 and is arranged within the bread case 30. The connection member 38 separably connected to the connection portion 24*a* of the second pulley 24 is fixed to the lower end of the rotating shaft 37 placed in the base 36. In the upper end of the rotating shaft 37 placed within the bread case 30, by cutting out a part of an outer peripheral portion in an axial direction, a connection portion 37*a* having a D shape (non-circular) sectional configuration to be connected to the blade member 40 is provided.

Figure 3:
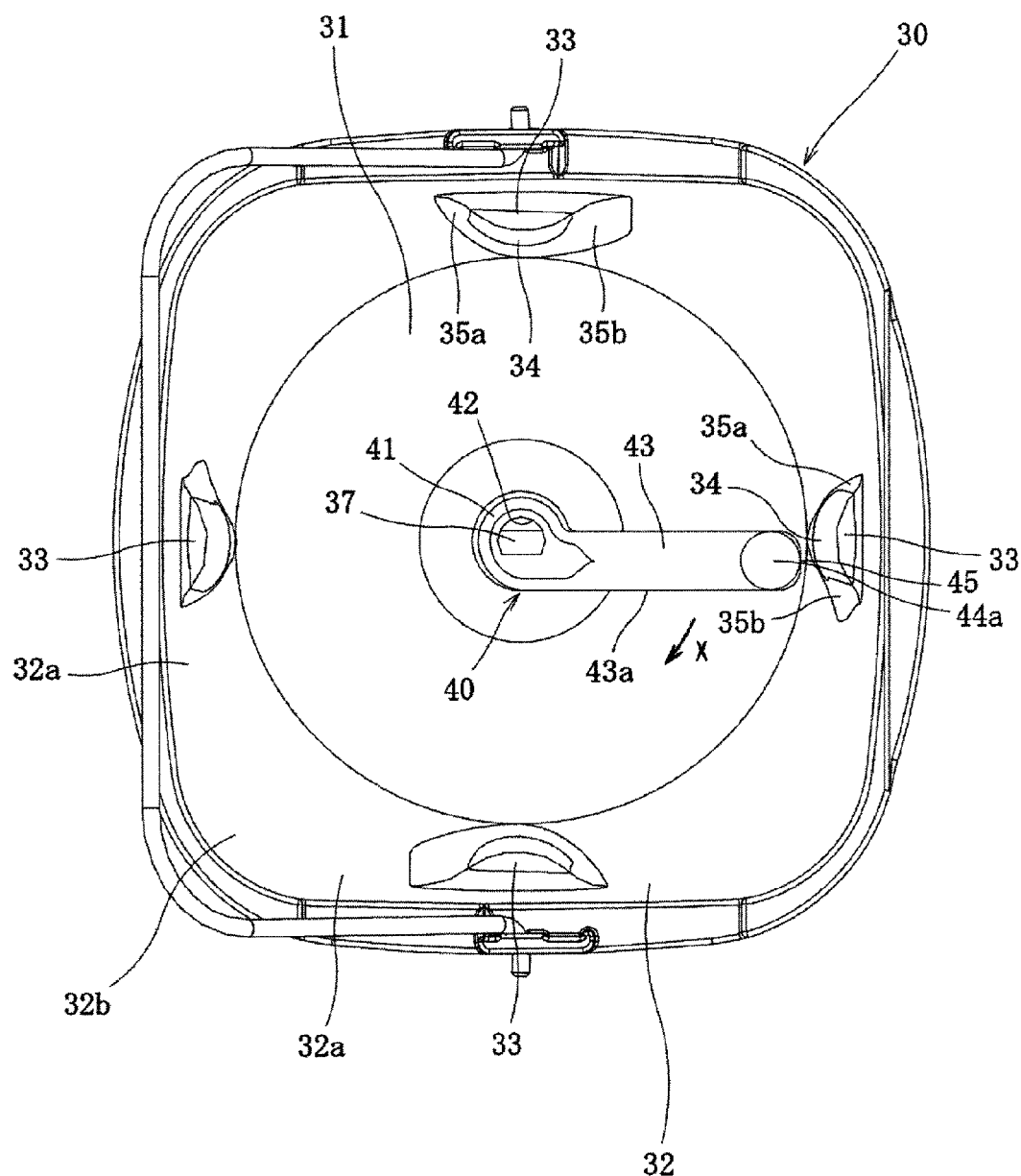
FIG. 3 is a plan view of the bread case and the blade member.

With reference to FIG. 3 together, when viewed from a direction along an axial line of the rotating shaft 37, an outer peripheral wall 32 of the bread case 30 has a polygon-like configuration including at least three flat plate portions 32*a* having portions with being apart at the same distances with respect to the rotating shaft 37. The outer peripheral wall 32 of the present embodiment is formed so as to have a regular square-like configuration including the two pairs of flat plate portions 32*a* arranged in parallel. The rotating shaft 37 is rotatably arranged in the bottom wall 31 so as to be placed in center of this outer peripheral wall 32. The flat plate portions 32*a* project upwardly from an outer peripheral portion of the bottom wall 31 along the axial line of the rotating shaft 37. The adjacent flat plate portions 32*a*, 32*a* continue to each other via a curved plate portion 32*b* having an arc-like configuration.

A center portion of each of the flat plate portions 32*a* having a regular square-like configuration is the portion with being apart at the same distance with respect to the rotating shaft 37, and has the shortest distance from the rotating shaft 37. A projecting ridge 33 projecting toward the rotating shaft 37 is provided in the center portion of this flat plate portion 32*a*. This projecting ridge 33 is formed by bending the flat plate portion 32*a* inwardly, and extends in an up-and-down direction along the axial line of the rotating shaft 37. The projecting ridge 33 has an arc surface-like configuration in which a projecting top portion 34 is placed on a reference line (not shown) extending in an orthogonal direction from the rotating shaft 37 toward the flat plate portion 32*a*. Continuous portions 35*a*, 35*b* continuing to the flat plate portion 32*a* so as to have a circumscribed circle-like configuration are provided on both sides of the projecting ridge 33. Radiuses of curvature of the continuous portions 35*a*, 35*b* relate to size of step portions formed between the projecting ridge 33 and the flat plate portion 32*a*, and this size of the step portions relates to flow resistance against the bread ingredients. In the present embodiment, the radius of curvature of the first continuous portion 35*a* placed at a rear side of a rotational direction X of the blade member 40 is smaller than the radius of curvature of the second continuous portion 35*b* placed at a front side of the rotational direction X of the blade member 40. Thereby, the flow resistance against the bread ingredients is set to be large at a side of the first continuous portion 35*a* and small at a side of the second continuous portion 35*b*.

(Detail of Blade Member)

As shown in FIGS. 1 and 2, the blade member 40 is detachably connected to the connection portion 37*a* of the rotating shaft 37 within the bread case 30, and the bread ingredients within the bread case 30 is mulled by rotation of the rotating shaft 37. With reference to FIGS. 4A to 4D together, the blade member 40 includes a shaft portion 41 having a conical trapezoid-like configuration connected to the rotating shaft 37. As the most clearly shown in FIG. 1, a total height of the shaft portion 41 is greater than a total height of the connection portion 37*a* of the rotating shaft 37.

Figure 4A:
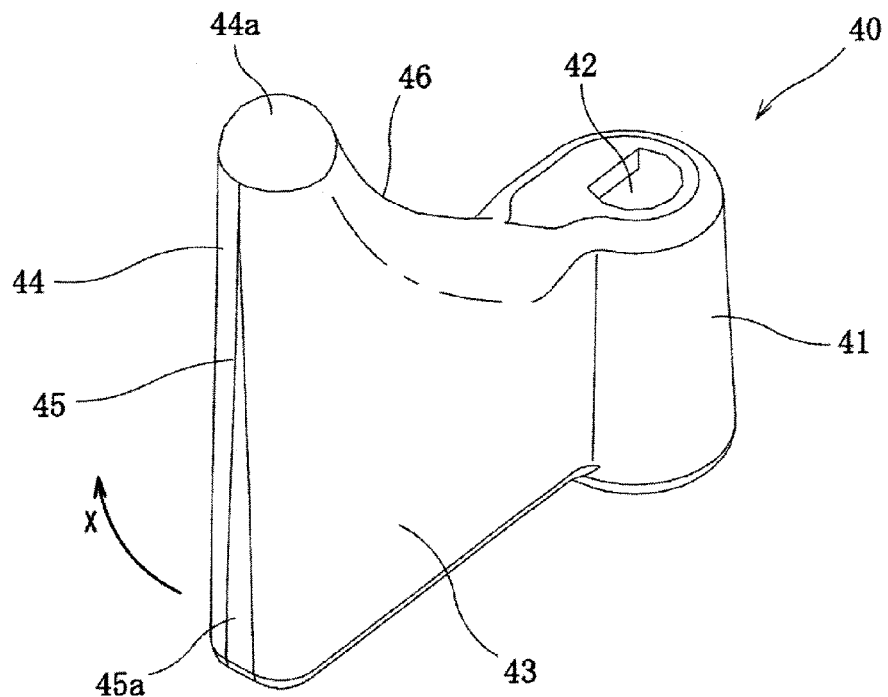
FIG. 4A is a perspective view of the blade member.

With reference to FIGS. 1 and 4A, in the shaft portion 41, a connection shaft hole 42 having a D shape sectional configuration for connecting with being incapable of rotating with respect to the rotating shaft 37 is provided so as to extend along the axial direction.

Figure 4B:
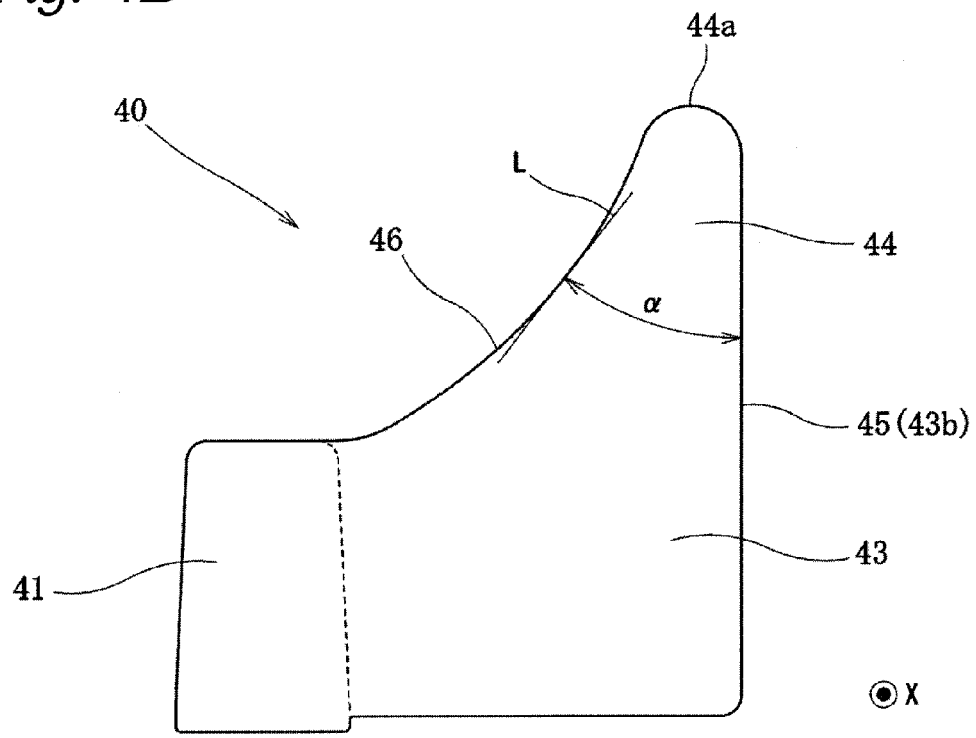
FIG. 4B is a front view of the blade member.
Figure 4C:
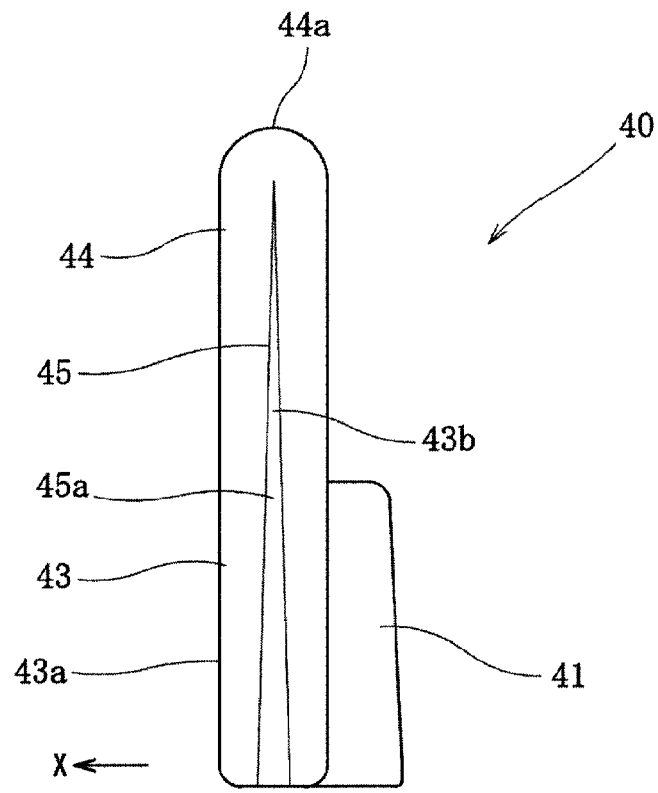
FIG. 4C is a side view of the blade member.
Figure 4D:
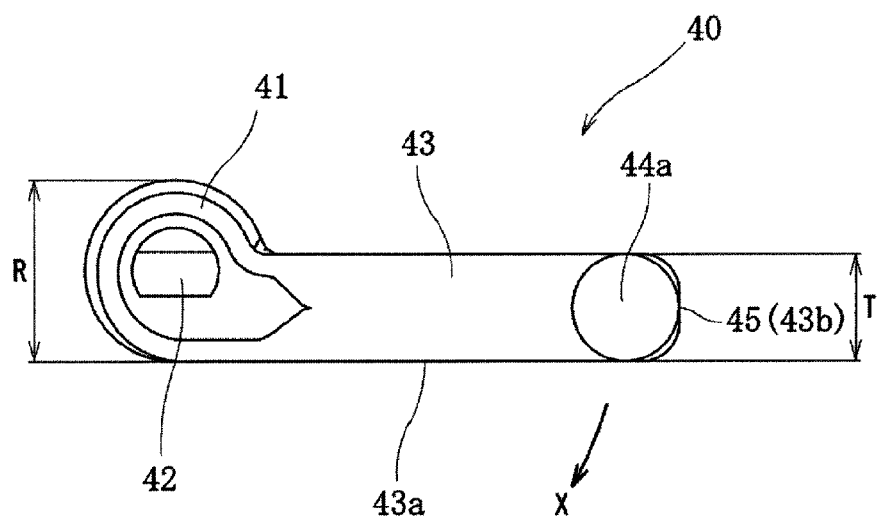
FIG. 4D is a plan view of the blade member.

The blade member 40 includes a blade plate portion 43 projecting from the shaft portion 41 toward the outer peripheral wall 32 of the bread case 30. As shown in FIGS. 4B to 4D, this blade plate portion 43 projects in a tangent line direction from a predetermined position of an outer peripheral portion of the shaft portion 41. The blade plate portion 43 has a plane-like configuration without being formed with a through-out portion, and extends in the up-and-down direction along the shaft portion 41. With reference to FIG. 3, the blade plate portion 43 is formed in such a manner that a tangent plane 43*a* with respect to the shaft portion 41 is placed at the front side of the rotational direction X.

As shown in FIGS. 4A to 4D, the blade plate portion 43 is formed with a projection portion 44 projecting upwardly at a side of a tip end 43*b* where a distance (radius) from the shaft portion 41 is the greatest in a plan view which is a side of the outer peripheral wall 32 of the bread case 30. That is, the projection portion 44 of the present embodiment is provided so as to be placed in the tip end 43*b* of the blade plate portion 43. A tip end rim portion 45 of the blade plate portion 43 formed in such a way extends in the up-and-down direction so as to have a straight-like configuration. A top portion 44*a* of this projection portion 44 is placed in the uppermost end in the blade member 40. The top portion 44*a* is set to have the substantially same height as a diameter of a ball of the bread ingredients having a paste-like configuration in a state where the bread ingredients for a loaf of bread are housed inside the bread case 30 and the bread ingredients have the paste-like configuration by mulling.

With reference to FIG. 1, the tip end rim portion 45 of the blade plate portion 43 extends in a direction orthogonal to the bottom wall 31 of the bread case 30, and is placed along the projecting top portion 34 of the projecting ridge 33 serving as an inner side surface of the outer peripheral wall 32. The placement of the tip end rim portion 45 of the blade plate portion 43 along the projecting ridge 33 of the bread case 30 includes a state where these are placed in parallel as a matter of course and a state where those are placed substantially in parallel while being slightly inclined as in the present embodiment. A gap between the tip end rim portion 45 of the blade plate portion 43 and the projecting ridge 33 of the bread case 30 is preferably within a set gap range of 5 mm or more and 20 mm or less. This is because, of less than 5 mm, the gap becomes too small and hence a possibility that the bread ingredients are clogging is generated. This is also because, of more than 20 mm, the gap becomes too large and hence an effect of pulling the bread ingredients out is eliminated. That is, the tip end rim portion 45 of the blade plate portion 43 is preferably placed along the projecting ridge 33 of the bread case 30 in such a manner that the gap between the tip end rim portion 33 and the projecting ridge 33 of the bread case 30 becomes 5 mm or more and 20 mm or less.

The upper rim portion 46 of the blade plate portion 43 has a height gradually increasing from the shaft portion 41 to the top portion 44*a* of the projection portion 44. As the most clearly shown in FIG. 4B, when the blade plate portion 43 is viewed from the front side of the rotational direction X, the upper rim portion 46 of the blade plate portion 43 is formed so as to have a curve-like configuration curved toward the tip end rim portion 45 in such a manner that an angle α made by a tangent line L of the upper rim portion 46 and the tip end rim portion 45 becomes the acutest angle in the top portion 44a. The upper rim portion 46 of the blade plate portion 43 of the present embodiment is formed with a part of a circumscribed circle to an upper end of the shaft portion 41 and the top portion 44a of the projection portion 44. Thereby, an angled portion is prevented from being formed in a border portion between the upper rim portion 46 and the shaft portion 41, and in a border portion between the upper rim portion 46 and the top portion 44a. The blade plate portion 43 formed in such a way has a mount-like configuration in which a width between the tip end rim portion 45 and the upper rim portion 46 is gradually increased with being away from the top portion 44a toward a lower side. That is, the blade plate portion 43 is not formed with any portion projecting with a rod-like configuration.

As shown in FIG. 4D, the blade plate portion 43 is formed so as to have a wall thickness T which is substantially half an outer diameter R of the shaft portion 41. The blade member 40 used in the bread making apparatus 10 is arranged within the bread case 30 together with the bread ingredients before executing the bread making processing and attached until the bread making processing is completed. Therefore, a dent due to the blade member 40 is formed in the cooked bread. Thus, preferably, by thinning the wall thickness T of the blade plate portion 43 as far as possible, the dent formed in the bread is reduced as far as possible. However, when the wall thickness T of the blade plate portion 43 is thinned too much, the tip end rim portion 45 and the upper rim portion 46 become sharp, and hence breakage is generated in the bread ingredients having the paste-like configuration at the time of mulling. By this breakage of the bread ingredients, gluten generated at the time of mulling is also broken. Gluten is to produce smoothness and stretch of the bread dough. Therefore, the breakage of gluten means that smoothness and stretch of the bread dough are lost. Thus, the wall thickness T of the blade plate portion 43 is preferably within a set wall thickness range of 4 mm or more and 15 mm or less.

Even with the wall thickness T of the blade plate portion 43 being within a preferable range, when angled portions are provided in the top portion 44a, the tip end rim portion 45, and the upper rim portion 46, the breakage is generated in the bread ingredients having the paste-like configuration at the time of mulling. Therefore, the top portion 44a, the tip end rim portion 45, and the upper rim portion 46 serving as portions of kneading and pulling the bread ingredients out are non-edge surfaces without being formed with angled portions. The non-edge surface without being formed with the angled portion is a surface where planar surfaces having different inclination angles do not cross each other. That is, the surface means a configuration including a planar surface and a curved surface in contact with the planar surface, a configuration including a pair of curved surfaces having different radiuses of curvature in contact with each other, and the like.

In detail, the top portion 44a of the projection portion 44 is preferably chamfered at least at the front side of the rotational direction X of the blade member 40 so as to have a radius of curvature of 30% or more and 50% or less of the wall thickness T of the blade plate portion 43. The wall thickness T of the blade plate portion 43 is a minimum value of the preferable range described above. The top portion 44a of the present embodiment is chamfered so as to have a radius of curvature of 50% of the wall thickness T in such a manner that the top portion is formed with a part of a sphere surface including rims at the front side and the rear side of the rotational direction X of the blade member 40.

The tip end rim portion 45 of the blade plate member 43 placed in a lower portion of the top portion 44a is, as well as the top portion 44a, preferably chamfered at least at the front side of the rotational direction X of the blade member 40 so as to have a radius of curvature of 30% or more and less than 50% of the wall thickness T of the blade plate portion 43. The blade plate portion 43 of the present embodiment is chamfered at the front and rear rims of the rotational direction X. As the most clearly shown in FIGS. 4C and 4D, a lower end of the top portion 44a is chamfered at front and rear rims so as to have a first radius of curvature C1 (50%) as described above. A lower end of the tip end rim portion 45 is chamfered at front and rear rims so as to have a second radius of curvature C2 which is smaller than the first radius of curvature C1 (such as 35% of the wall thickness T). The tip end rim portion 45 is chamfered at front and rear rims of the tip end rim portion 45 in such a manner that the radius of curvature C is gradually decreased from an upper end to the lower end. The tip end rim portion 45 formed in such a way is formed with a flat surface 45a temporarily placed in parallel to the flat plate portions 32a of the bread case 30 so as to form an isosceles triangle.

The upper rim portion 46 extending from the shaft portion 41 to the top portion 44a in the blade plate portion 43 is preferably chamfered at least at the front side of the rotational direction X of the blade member 40 so as to have a radius of curvature of 30% or more and 50% or less of the wall thickness T of the blade plate portion 43. The blade plate portion 43 of the present embodiment is chamfered at the front and rear rims of the rotational direction X so as to have a radius of curvature of 50% of the wall thickness T in such a manner that the upper rim portion 46 has the semicircular sectional configuration.

In such a way, in the blade member 40, the top portion 44a of the projection portion 44, the tip end rim portion 45, and the upper rim portion 46 that perform the actions of kneading and pulling the bread ingredients out, and moving and stretching the bread ingredients having the paste-like configuration are fully curved without being formed with angled portions. Therefore, the bread making apparatus 10 in which this blade member 40 is used can suppress addition of an excessive load onto a part of the bread ingredients, mull the bread ingredients without generating the breakage, and make a smooth and well-stretching bread dough.

In detail, when the blade member 40 connected to the rotating shaft 37 is rotated, the bread ingredients housed within the bread case 30 are agitated so as to be pushed out to the outer peripheral wall 32 of the bread case 30. At this time, the projection portion 44 is provided at the side of the tip end 43b of the blade member 40 which is the side of the outer peripheral wall 32 of the bread case 30. Thus, a total height at the side of the outer peripheral wall 32 of the bread case 30 is increased. Therefore, the actions of pressing the bread ingredients onto the bread case 30 to knead by the blade member 40 and stretching the bread ingredients by the blade member 40 can be sufficiently obtained.

By the projection portion 44 including the top portion 44a formed with the non-edge surface, the blade member 40 can grab the bread ingredients having the paste-like configuration and perform the actions of moving and stretching without generating the breakage. Therefore, without holding the bread ingredients in a part of the bread case 30, the bread ingredients can be evenly and sufficiently mulled, and a smooth and well-stretching dough can be made.

The upper rim portion 46 of the blade plate portion 43 has the height gradually increasing from the shaft portion 41 to the top portion 44a of the projection portion 44. Therefore, a portion projecting upwardly in the blade plate portion 43 is only the top portion 44a. Thus, portions other than the top portion 44a do not grab the ingredients having the paste-like configuration, so that the breakage of the ingredients can be suppressed. Therefore, a smooth and well-stretching dough can be made.

Moreover, the upper rim portion 46 has the curve-like configuration curved toward the tip end rim portion 45 of the blade plate portion 43. Therefore, generation of the breakage of the ingredients due to the addition of an excessive load onto a part of the ingredients at the time of mulling can be suppressed. The blade plate portion 43 has the acutest angle in the top portion 44a. Thus, an action of grabbing the bread ingredients having the paste-like configuration can be sufficiently obtained. By rotation of the blade member 40, the bread ingredients can be easily moved so as to come around the upper rim portion 46 of the blade plate portion 43. Thus, an action of kneading can be improved.

The width between the tip end rim portion 45 and the upper rim portion 46 of the blade plate portion 43 is gradually increased with being away from the top portion 44a of the projection portion 44. That is, the projection portion 44 does not project from the blade plate portion 43 with a rod-like configuration but projects with a substantially mount-like configuration. Thus, the generation of the breakage in the ingredients due to the addition of an excessive load onto a part of the ingredients at the time of mulling can be suppressed to the maximum extent possible.

The tip end rim portion 45 of the blade plate portion 43 is along the inner side surface of the outer peripheral wall 32 of the bread case 30. Moreover, the top portion 44a of the projection portion 44 is placed in the tip end rim portion 45 of the blade plate portion 43. Further, the tip end rim portion 45 of the blade plate portion 43 includes the flat surface 45a by chamfering so as to have a radius of curvature less than 50% of the wall thickness T. Therefore, a region where the bread ingredients are kneaded and stretched can be ensured. The bread case 30 has the polygon-like configuration including at least three flat plate portions 32a. Thus, by the rotation of the blade member 40, the actions of kneading and stretching the ingredients can be obtained respectively in the flat plate portions 32a. Moreover, since the projecting ridges 33 are provided in the bread case 30, the step portions are formed between the projecting ridges 33 and the flat plate portions 32a, and the step portions serve as the flow resistance against the ingredients. Thus, the actions of kneading and stretching the ingredients can be further improved.

It should be noted that the blade member 40 for mulling apparatuses of the present invention is not limited to the configuration of the above embodiment but various modifications can be made.

Figure 5A:
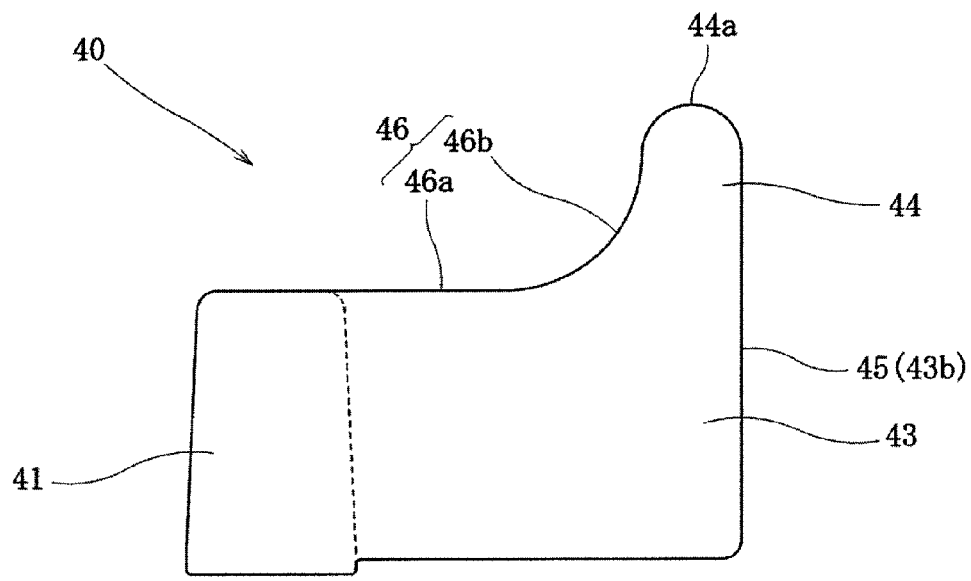
FIG. 5A is a front view of a modified example of the blade member.

For example, in the above embodiment, the upper rim portion 46 of the blade plate portion 43 has the height gradually increasing from the shaft portion 41 to the top portion 44a. However, the upper rim portion may be formed as in a first modified example shown in FIG. 5A. This first modified example is also one example that the height is gradually increasing from the shaft portion 41 to the top portion 44a. An upper rim portion 46 of the first modified example includes a straight portion 46a horizontally extending from the shaft portion 41 at the same height, and a circumscribed circle arc portion 46b extending from the straight portion 46a to a top portion 44a. Even in such a way, by chamfering the straight portion 46a and the circumscribed circle arc portion 46b so that the portions have a predetermined radius of curvature, the same operations and effects as the above embodiment can be obtained.

Figure 5B:
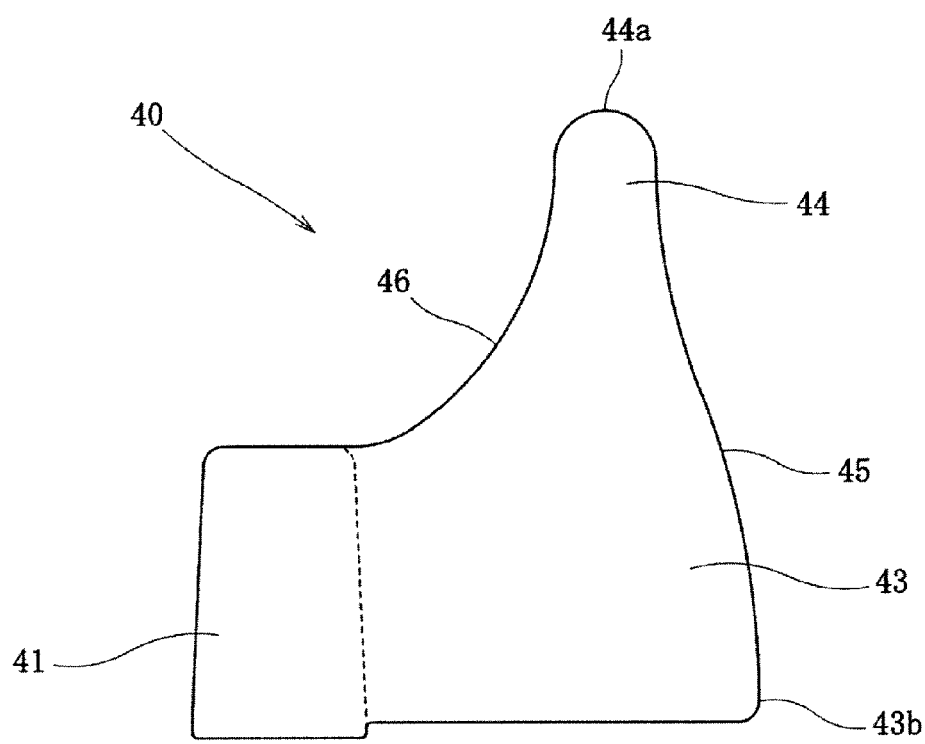
FIG. 5B is a front view of other modified example of the blade member.

In the above embodiment, the top portion 44a of the projection portion 44 is provided so as to be placed in the tip end 43b of the blade plate portion 43. However, the top portion may be provided as in a second modified example shown in FIG. 5B. A projection portion 44 of this second modified example is provided at a side of a shaft portion 41 with being apart at a predetermined distance from a tip end 43b of a blade plate portion 43. A tip end rim portion 45 of the blade plate portion 43 is formed with a rim continuing to a top portion 44a of the projection portion 44 so as to have a curved streamline-like configuration. A lower end of this tip end rim portion 45 is a portion where a distance from the shaft portion 41 is the greatest in a plan view, serving as the tip end 43b of the blade plate portion 43. The top portion 44a of the projection portion 44 is preferably provided at a side of the tip end 43b with respect to a position of ½ (half) of a total length of the blade plate portion 43 from the shaft portion 41, and further preferably provided at a side of the tip end 43b with respect to a position of ¾ of the total length of the blade plate portion 43 from the shaft portion 41. Preferably, the lower end of the tip end rim portion 45 is set within a set gap range with respect to projecting ridges 33 of a bread case 30, and an upper end is set out of the set gap range with respect to the projecting ridges 33. In such a way, in comparison to the above embodiment, although actions of kneading and pulling out between the tip end rim portion 45 and the bread case 30 are reduced, an action of grabbing bread ingredients having a paste-like configuration by the projection portion 44 can be improved. Thus, in comparison to the conventional example, a smooth and well-stretching bread dough can be made.

Figure 5C:
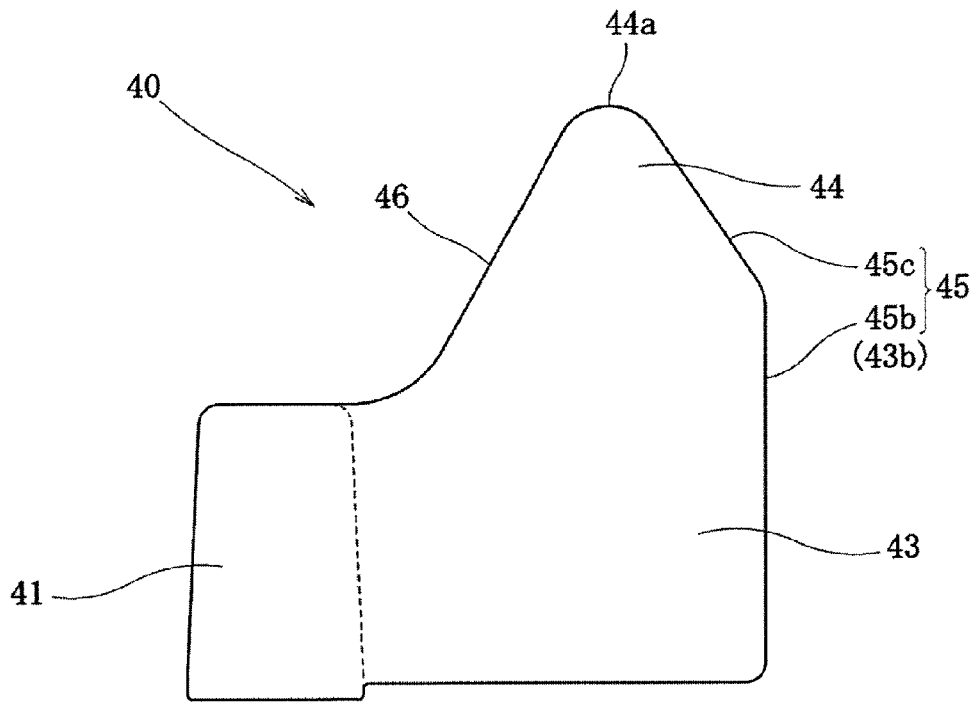
FIG. 5C is a front view of other modified example of the blade member.

In the second modified example, the tip end rim portion 45 of the blade plate portion 43 has the curved streamline-like configuration. However, the tip end rim portion may be formed as in a third modified example shown in FIG. 5C. A projection portion 44 of this third modified example is provided at a side of a shaft portion 41 with being apart at a predetermined distance from a tip end 43b of a blade plate portion 43 as well as the second modified example. A tip end rim portion 45 includes a perpendicular portion 45b extending within a set gap range along flat plate portions 32a of a bread case 30, and an inclined portion 45c inclined so as to extend from an upper end of the perpendicular portion 45b to a top portion 44a of the projection portion 44. An upper rim portion 46 is formed with a tangent line extending from the shaft portion 41 to the top portion 44a of the projection portion 44 so as to have a straight-like configuration. In such a way, bread ingredients can sufficiently be kneaded and pulled out between the perpendicular portion 45b and the bread case 30, and the bread ingredients having a paste-like configuration can be grabbed and moved by the top portion 44a of the projection portion 44. Therefore, a smooth and well-stretching bread dough can be made.

Figure 5D:
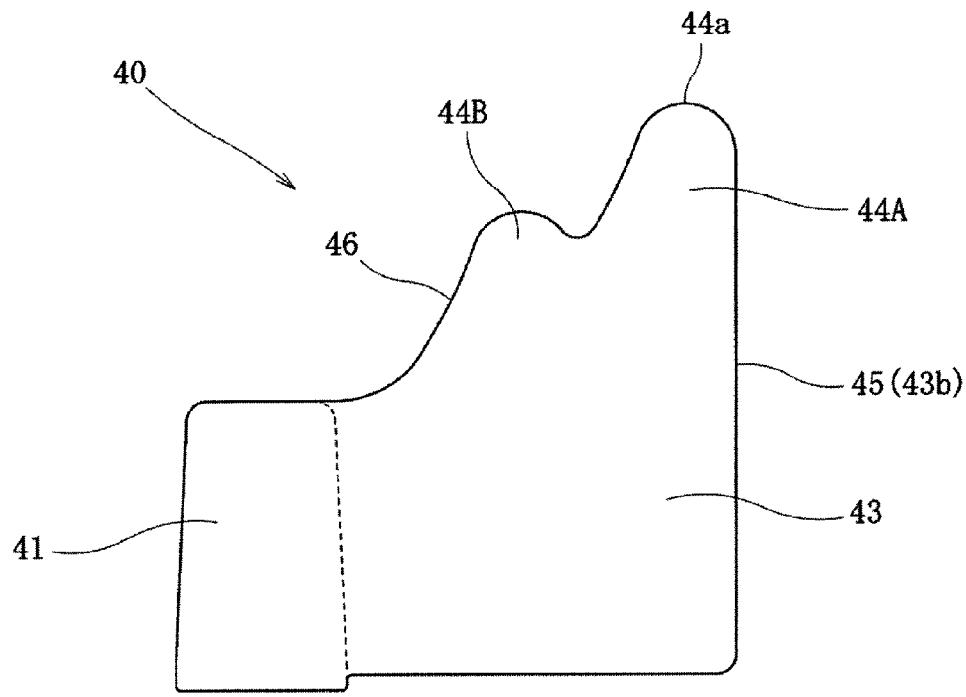
FIG. 5D is other modified example of the blade member.

In the embodiment and the modified examples, the projection portion 44 is provided only at one point of the blade plate portion 43. However, as in a fourth modified example shown in FIG. 5D, projection portions 44A, 44B may project from two points. It should be noted that in a case of this configuration, an upper end of the projection portion 44A having a higher total height serves as a top portion 44a. In such a way, an upper rim portion 46 of a blade plate portion 43 may have a height not gradually increasing from a shaft portion 41 to the top portion 44a (the height may be lowered once at the projection portion 44B).

In the above embodiment, the top portion 44a of the projection portion 44 is formed with a part of the sphere surface. However, the top portion may be formed with a non-edge surface chamfered so as to have a radius of curvature of 30% or more and 50% or less of the wall thickness T (at least a part of the sphere surface). The tip end rim portion 45 has the radius of curvature gradually downwardly decreased. However, with a non-edge surface having a radius of curvature of 30% or more and less than 50% of the wall thickness T, the tip end rim portion may be chamfered so as to have the same radius of curvature from the upper end to the lower end or may be chamfered so as to have different radiuses of curvature. The upper rim portion 46 is formed so as to have the semicircular sectional configuration. However, the upper rim portion may be formed with a non-edge surface chamfered so as to have a radius of curvature of 30% or more and 50% or less of the wall thickness T. The projection portion 44, the tip end rim portion 45, and the upper rim portion 46 do not have to be chamfered at a rear side as long as the portions are chamfered at a front side on the rotational direction X of the blade member 40.

The outer peripheral wall 32 of the bread case 30 is formed so as to have the regular square-like configuration when viewed from the direction along the axial line of the rotating shaft 37. However, the outer peripheral wall may be formed so as to have a triangle-like configuration or a polygon-like configuration of a plane figure having five or more angles. As a matter of course, size in a lateral direction of the flat plate portions 32a is not necessarily the same. The rotating shaft 37 may be arranged in a portion other than center of the bread case 30.

The rotating shaft 37 is rotatably arranged in the bottom wall 31 of the bread case 30. However, the rotating shaft 37 projecting from the drive mechanism 20 may pass through the bottom wall 31 of the bread case 30 and the connection portion 37a at a tip end may be arranged inside the bread case 30. That is, the rotating shaft 37 is not limited to be assembled to and integrated with the bread case 30 but may be arranged as a body separated from the bread case 30.

In the above embodiment, the blade member 40 of the present invention is applied to the bread making apparatus 10 capable of cooking a loaf of bread as one example of the mulling apparatus. However, the blade member may also be applied to a mulling apparatus capable of only mulling. As a matter of course, the blade member 40 can be used not only for making a bread dough but also for the purpose of mulling other ingredients.

What is claimed is:

1. A blade member for mulling apparatuses, comprising:
a shaft portion configured to connected to a rotating shaft arranged within a container of a mulling apparatus; and
a blade plate portion having a plane-like configuration without being formed with a through-out portion, projecting from the shaft portion toward an outer peripheral wall of the container, and extending in an up-and-down direction along the shaft portion,
wherein the blade plate portion includes a projection portion formed at the most tip end side of the blade plate portion mostly apart from the shaft portion, the projection portion projecting upwardly,
wherein a top portion of the projection portion is non-edge surface without being formed with an angled portion, and
wherein a tip end rim portion of the blade plate portion has a straight-like configuration extending in an up-and-down direction.

2. The blade member for mulling apparatuses according to claim 1, wherein an upper rim portion of the blade plate portion has a height gradually increasing from the shaft portion to the top portion of the projection portion.

3. The blade member for mulling apparatuses according to claim 2, wherein the upper rim portion of the blade plate portion has a curve-like configuration curved toward a tip end rim portion of the blade plate portion when the blade plate portion is viewed from a front side of a rotational direction.

4. The blade member for mulling apparatuses according to claim 1, wherein a width between the tip end rim portion and the upper rim portion of the blade plate portion is gradually increased with being away from the top portion of the projection portion.

5. The blade member for mulling apparatuses according to claim 1, wherein at least a part of the tip end rim portion of the blade plate portion is along an inner side surface of the outer peripheral surface.

6. The blade member for mulling apparatuses according to claim 1, wherein the top portion of the projection portion is formed with at least a part of a sphere surface.

7. The blade member for mulling apparatuses according to claim 6, wherein at least a part of the tip rim portion of the blade plate portion at a lower side with respect to the top portion of the projection portion is chamfered so as to have a radius of curvature less than 50% of a wall thickness of the blade plate portion.

8. The blade member for mulling apparatuses according to claim 1, wherein the upper rim portion of the blade plate portion is chamfered so as to have a semicircular sectional configuration.

9. A mulling apparatus, comprising a blade member, wherein the blade member for mulling apparatuses, comprises:
a shaft portion configured to connected to a rotating shaft arranged within a container of a mulling apparatus; and
a blade plate portion having a plane-like configuration without being formed with a through-out portion, projecting from the shaft portion toward an outer peripheral wall of the container, and extending in an up-and-down direction along the shaft portion,
wherein the blade plate portion includes a projection portion formed at the most tip end side of the blade plate portion mostly apart from the shaft portion, the projection portion projecting upwardly,
wherein a top portion of the projection portion is non-edge surface without being formed with an angled portion, and
wherein a tip end rim portion of the blade plate portion has a straight-like configuration extending in an up-and-down direction.

10. The mulling apparatus according to claim 9, wherein the outer peripheral wall of the container has a polygon-like configuration including at least three flat plate portions having portions with being apart at same distances with respect to the rotating shaft, and
wherein the portions of the flat plate portions are respectively formed with projecting ridges extending in the up-and-down direction and projecting toward the rotating shaft.

* * * * *